United States Patent
Bunce et al.

(10) Patent No.: US 10,218,391 B1
(45) Date of Patent: Feb. 26, 2019

(54) SYSTEMS AND METHODS PROVIDING A LOW-POWER MODE FOR SERIAL LINKS

(71) Applicant: QUALCOMM Incorporated, San Diego, CA (US)

(72) Inventors: Robert Michael Bunce, Cary, NC (US); Carrie Ellen Cox, Apex, NC (US); Victor Git-Han Moy, Durham, NC (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/666,764

(22) Filed: Aug. 2, 2017

(51) Int. Cl.
*H04L 7/04* (2006.01)
*H04B 1/02* (2006.01)
*H04B 1/06* (2006.01)

(52) U.S. Cl.
CPC .............. *H04B 1/02* (2013.01); *H04B 1/06* (2013.01); *H04L 7/04* (2013.01)

(58) Field of Classification Search
CPC   H04L 1/205; H04L 25/20; H04L 7/04; H04B 1/04; H04B 1/02
USPC .......... 375/219–222, 354–358, 295
See application file for complete search history.

(56) References Cited

U.S. PATENT DOCUMENTS

| | | |
|---|---|---|
| 6,819,150 B1 | 11/2004 | Santosa et al. |
| 7,352,248 B2 | 4/2008 | Meltzer et al. |
| 7,752,476 B2 | 7/2010 | Macri et al. |
| 8,923,087 B2 | 12/2014 | Mehta et al. |
| 9,304,579 B2 | 4/2016 | Ware et al. |
| 9,467,120 B1 | 10/2016 | Song |
| 2008/0235526 A1* | 9/2008 | Lee ................ G06F 1/3215 713/320 |
| 2009/0024864 A1* | 1/2009 | Sugimoto ............ G06F 5/06 713/501 |
| 2012/0216084 A1* | 8/2012 | Chun .................. H04L 25/02 714/708 |
| 2013/0170579 A1* | 7/2013 | Nishioka ............. H04L 7/10 375/295 |
| 2013/0322506 A1* | 12/2013 | Zerbe ................ H04L 1/0026 375/224 |
| 2014/0089541 A1* | 3/2014 | Tresidder ............ G06F 13/42 710/105 |
| 2014/0114887 A1 | 4/2014 | Iyer et al. |

(Continued)

OTHER PUBLICATIONS

International Search Report and Written Opinion—PCT/US2018/038065—ISA/EPO—dated Sep. 26, 2018.

*Primary Examiner* — Emmanuel Bayard
(74) *Attorney, Agent, or Firm* — Haynes and Boone, LLP (36340)

(57) ABSTRACT

Systems and methods to provide a low-power mode for serial links are disclosed. One embodiment of such a system includes a transmitter coupled to a link; a receiver coupled to the link and configured to receive signals over the link from the transmitter; a transmit control module configured to cause the transmitter to enter and exit a low-power mode; and a clock module coupled to the transmitter and configured to provide a clock signal to the transmitter, wherein the clock module is further configured to provide the clock signal as a divided clock signal to the transmitter when the transmitter is in the low-power mode, further wherein the divided clock signal has a same phase as the clock signal before entry into the low-power mode.

18 Claims, 7 Drawing Sheets

(56) References Cited

U.S. PATENT DOCUMENTS

| | | | |
|---|---|---|---|
| 2014/0140380 A1* | 5/2014 | Warke | H04L 7/10 375/219 |
| 2015/0363350 A1* | 12/2015 | Yeung | G06F 13/4221 710/106 |
| 2016/0156478 A1* | 6/2016 | Zhao | H04L 12/12 398/45 |
| 2017/0177061 A1* | 6/2017 | Kumar | G06F 3/0625 |
| 2018/0067538 A1* | 3/2018 | Ware | G11C 7/10 |

* cited by examiner

SYSTEMS AND METHODS PROVIDING A LOW-POWER MODE FOR SERIAL LINKS

TECHNICAL FIELD

The present application relates, generally, to high-speed serial links and, more specifically, to low-power modes for high-speed serial links.

BACKGROUND

High-speed serial links may be used, for example, to carry data between two CPUs or other processing devices. High speed serial links, such as those used in Peripheral Component Interconnect (PCI) Express, usually support some form or forms of low power modes which the link can go into when there is no system data to transmit and the link is inactive. For instance, some high-speed serial links may use power at transmit circuitry (e.g., data drivers) and/or at receive circuitry (e.g., data capture circuitry) as data is transmitted over the links. Low-power modes seek to save some of that power by, e.g., turning off transmit circuitry and/or receive circuitry.

The level of power savings has a general relationship to the time it takes to enter into and exit out of that power savings state; that is, the usual expectation is that the greater the power savings of a state, the longer it takes to enter or exit that state. Long entry and exit times are usually undesirable due to the impact on computer system performance. When a link is in a low power mode and system data traffic becomes available again, the system may then have to wait for the link to exit the low power mode before it can be transferred.

Long low power mode entry times may reduce the time in the low power mode, which may reduce the amount of power saved. Furthermore, if the link is designed such that it fully enters the low power mode before it can exit, system performance may be doubly affected if data traffic shows up right after the link starts its sequence to enter the low power savings state and data traffic then waits for both the entry and exit times.

Typical high speed serial links have low power mode entry and exit times measured in milliseconds or microseconds. Specifically, some serial links may include a plurality of channels, and a conventional low power mode technique may include shutting down the receive side circuitry for some or all of the serial links. However, during that time the serial links have been shut down, the receiver may lose a phase lock on its input data signal and may also lose its equalization and gain settings. The exit time (i.e., returning to active mode from a low-power mode) may include time to lock on a phase of the input data signal and establish equalization and gain settings.

Accordingly, there is a need in the art for systems and methods that provide real power savings through use of low-power modes and also reduce entry and exit times compared to conventional solutions.

SUMMARY

Various embodiments provide systems and methods that provide low-power states for serial links. Some embodiments include entering a low-power state on a transmitter side by dividing a transmitter clock so that the transmitter operates at a lower clock rate during the low-power mode. Furthermore, during the example low-power mode, the clock on the transmit side has a same phase relationship to the undivided clock so that the bits sent over the interface also have a same phase relationship as would be experienced during a normal operation active mode. The same phase relationship of the divided clock, and therefore the resulting bits sent over the interface, allows the receiver side to maintain phase lock during the low-power mode. Therefore, the example embodiment may allow for dynamic power savings by reducing a rate of operation of the transmit side while allowing quick entry and exit because the receiver side maintains its phase lock.

According to one embodiment, a system includes: a transmitter coupled to a link; a receiver coupled to the link and configured to receive signals over the link from the transmitter; a transmit control module configured to cause the transmitter to enter and exit a low-power mode; and a clock module coupled to the transmitter and configured to provide a clock signal to the transmitter, wherein the clock module is further configured to provide the clock signal as a divided clock signal to the transmitter when the transmitter is in the low-power mode, further wherein the divided clock signal has a same phase as the clock signal before entry into the low-power mode.

According to another embodiment, a method includes: transmitting data signals from a transmitter to a receiver over a serial data link during a first mode of operation; causing the transmitter to enter a low-power mode of operation in response to monitoring data transmission during the first mode of operation; in response to entering the low-power mode of operation, causing a clock module at the transmitter to assume a divided operation with a same phase alignment as during the first mode of operation; and maintaining a phase lock on the data signals by the receiver during the first mode of operation and during the low-power mode of operation.

According to another embodiment, an apparatus includes: means for transmitting data signals over a serial data link; means for receiving the data signals over the serial data link; means for providing a clock signal to the transmitting means, including means for providing the clock signal as a divided clock signal to the transmitting means when the transmitting means is in a low-power mode, wherein the divided clock signal has a same phase as the clock signal before entry into the low-power mode.

DETAILED DESCRIPTION

Figure 1:
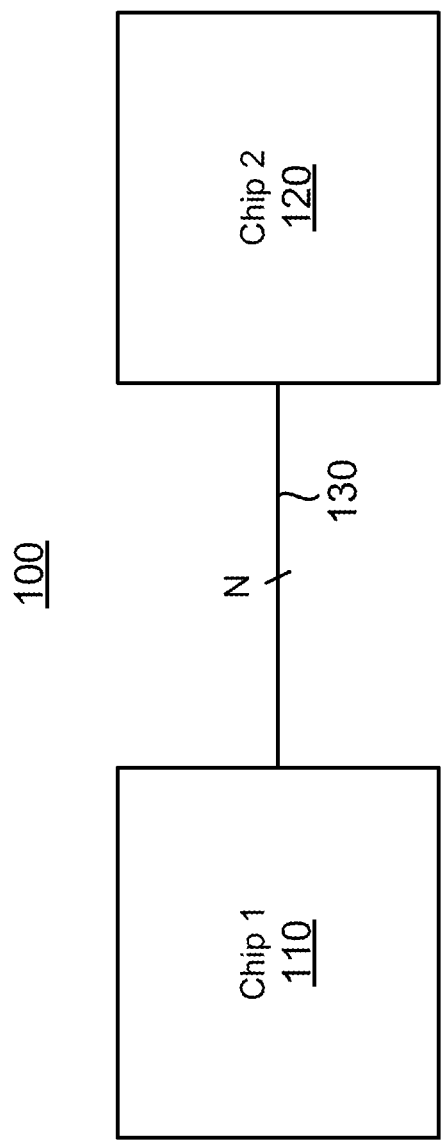
FIG. 1 is an illustration of an example chip-to-chip interface, according to various embodiments.

Various embodiments include circuits and methods to provide low-power modes at high-speed serial links, wherein those low-power modes may be entered into and exited from relatively quickly. In one example, an upper-level logic such as a transmit control module may monitor a first in first out (FIFO) buffer or other data queue to determine to enter into a low-power mode by discerning that there are no data bits in the queue to transmit or that no data has been placed in the queue in a certain amount of time. The transmit control module may then send a message to upper-level logic at the receiver (e.g., receiver control module) to inform the receiver that it is about to enter a low-power mode. In response, the receiver then instructs its receive circuitry to halt adaptively applying equalization and variable gain and to save its equalization and variable gain settings. In some embodiments, the receiver causes its receive circuitry to apply gain and equalization at the saved settings until the adaptive algorithm is resumed at exit of the low-power mode. In this example, the receiver stays on throughout the low-power mode and the active mode.

The transmit control module puts its transmit circuitry in a low-power mode by reducing a clock frequency of the transmit circuitry. In one example, a divide-by-8 clock gating system may be used to output one pulse having a same phase as a digital one pulse in the clock while gating off seven other digital ones in a given group of eight clock pulses. The transmit control module may also generate a pattern of ones and zeros that is transmitted by the transmit circuitry at edges of the divided clock. This pattern of ones and zeros is transmitted to the receiver in place of system data. Thus, in the example low-power mode, the transmit circuitry continues to operate, but at a lower clock frequency. The receive circuitry also continues to operate and in fact continues to maintain its phase lock on the received pattern of ones and zeros at the lower clock frequency.

At a later time, the transmit control module may discern that there are bits of system data in the data queue to transmit, so it begins the process of exiting the low-power mode and back to active mode. The transmit control module then returns to its normal clock frequency and also changes from generating its pattern of ones and zeros to using dummy data. The transmit control module then sends a message to the receiver control module that it is exiting the low-power mode. In response, the receiver control module resumes adaptively applying equalization and gain control by returning to closed loop adaptive algorithms starting with the saved equalization and variable gain control.

In this example, the receive circuitry does not need to start a phase lock on the signal because it has maintained its phase lock even through the low-power mode. Furthermore, the receive circuitry begins its adaptive functions by using the equalization and gain control settings that it had previously used before entering the low-power mode.

An advantage that some embodiments may have over conventional techniques is that the low power mode keeps the receiver "alive" enough to avoid the receiver wake up time upon mode exit. The transmitter may save dynamic power when entering this mode by dividing clocks on-the-fly by eight or some other factor. The transmitter will transmit a repeating pattern of zeros and ones in the low power mode which may have enough transition density for the receiver to maintain clock and data recovery (CDR) lock and avoid the need to re-lock upon mode exit. Because entry and exit may be performed quickly, a simple, purely hardware based decision to enter or exit the mode may be used in some instances, for example, if data resides in a transmit buffer or not.

FIG. 1 is an illustration of an example chip-to-chip interface 100, according to one embodiment. FIG. 1 shows two chips—chip 110 and chip 120, which in this case may be any appropriate semiconductor chip or chip package. In one example, chip 110 and chip 120 are both multi-core server processor chips that are each mounted in respective sockets, and those sockets are mounted on a printed circuit board or other appropriate substrate. Link 130 is a physical link made of a conductive material, such as copper, formed in traces or on the board. In fact, link 130 multiple (N) conductive lines from chip 110 to chip 120, where N is an integer greater than one.

Further continuing with this example, link 130 not only provides a chip-to-chip interface, but each of the conductive lines provides a high-speed serial link between a transmitter at chip 110 and a receiver at chip 120. As explained in more detail below, the transmitter at chip 110 may serialize data and send it over one of the conductive lines, where the serialized data is received at chip 110 and de-serialized accordingly.

The scope of embodiments is not limited to any particular type of chip. For instance, the principles described herein may be applied to systems on chip (SOCs), memory chips, and the like. Additionally, the scope of embodiments is not limited to any particular type of physical mounting, as any appropriate physical mounting may be used. Moreover, the principles described herein are not necessarily limited to chip-to-chip links, as they can be applied to any clock and data recovery (CDR) serializer/deserializer architecture where an incoming data phase is detected in the receiver.

Figure 2:
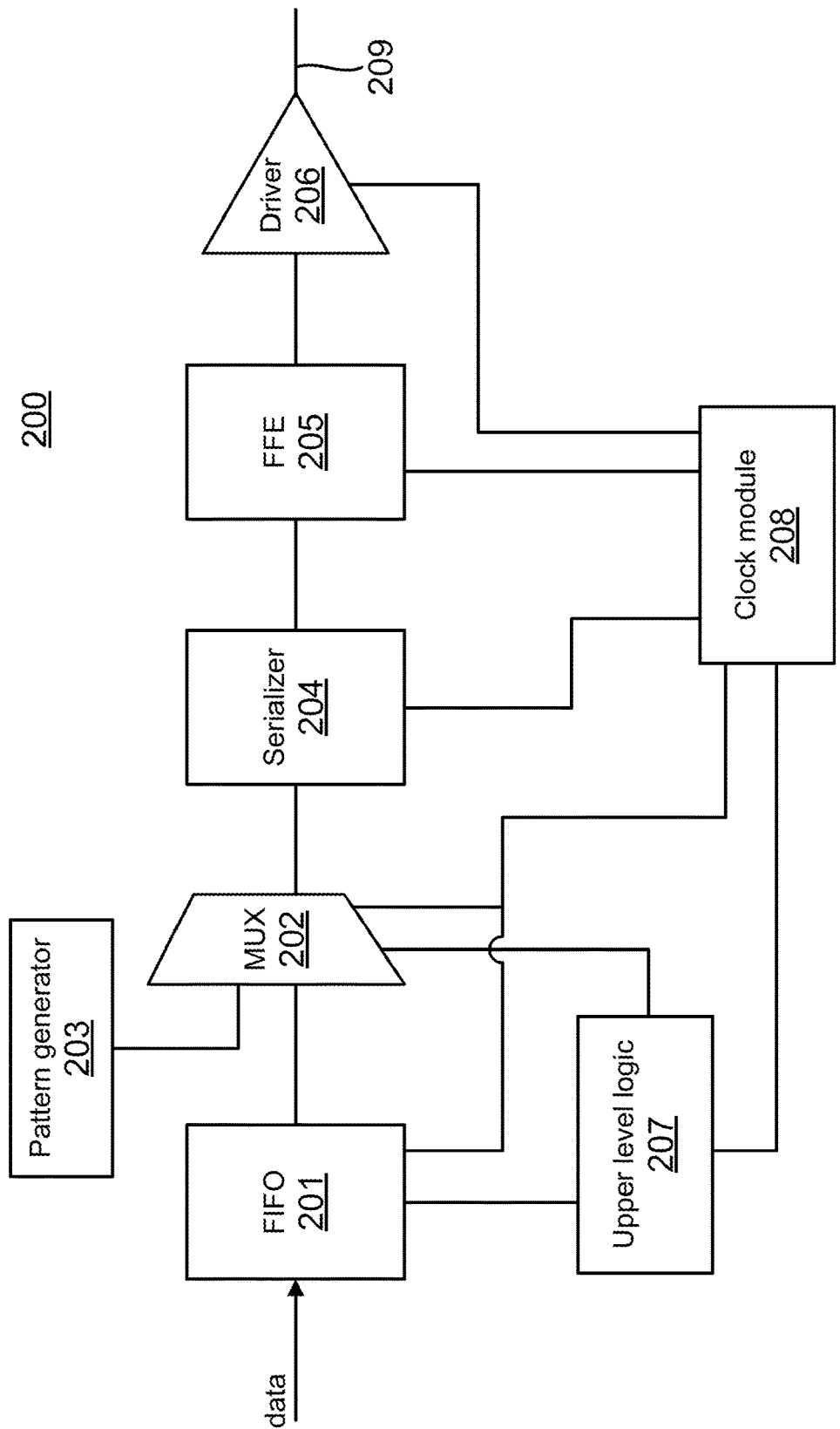
FIG. 2 is an illustration of example transmit side circuitry of the chip-to-chip interface of FIG. 1, according to one embodiment.

FIG. 2 is an illustration of an example transmitter 200, which may be used in the embodiment of FIG. 1. For instance, chip 110 of FIG. 1 may include multiple transmitters the same as or similar to transmitter 200, each of the transmitters transmitting data over one of the conductive lines of the link 130 to a respective receiver at chip 120. FIG. 2 illustrates one transmitter 200, and it is understood that the other transmitters on a chip may operate in the same or similar manner.

Transmitter 200 includes FIFO 201, which receives data in a parallel format from upstream logic (not shown). FIFO 201 sends its data to multiplexor 202. Multiplexor 202 selects between the data it receives from FIFO 201 and bits from pattern generator 203. In this example, the multiplexor 202 is controlled by upper-level logic 207, which may include a transmitter control module. Assuming that the system data, as opposed to the generated pattern, is output from multiplexor 202, the data is received by serializer 204, which changes the data from a parallel format into a serial format.

In one example, the data in parallel format is eight bits wide, and the serializer generates a single serialized output. Accordingly, the system clock that provides timing for FIFO 201 and multiplexor 202 may operate at a slower rate than the serializer clock that causes the data to be output at eight times the speed. Of course, the scope of embodiments is not limited to any particular width for parallel data, nor any particular clock speed. In any event, serializer 204 outputs the serialized data at some multiple clock rate corresponding to a width of the parallel format data.

The serialized data is received by feed forward equalization (FFE) module 205, which reshapes the data according to an adaptive algorithm to compensate for any expected signal distortion that may be experienced on the conductive line 209. Various embodiments may use any appropriate FFE algorithm. Driver 206 may include a latch that is clocked to launch the data and one or more amplifiers to provide an appropriate gain to the data as it is placed on the conductive line 209. In this example, conductive line 209 may correspond to one of the conductive lines of link 130 of FIG. 1.

Upper-level logic 207 includes hardware and/or software logic to determine when to put transmitter 200 into a low-power mode and when to exit the low-power mode to return to an active mode. In this example, upper-level logic 207 monitors FIFO 201 to determine when to enter and exit the low-power mode. For instance, if upper-level logic 207 determines that FIFO 201 is empty of system data, then upper-level logic 207 may determine that it is appropriate to enter into a low-power mode. Similarly, in another example, upper-level logic 207 may discern that the data line into FIFO 201 has been idle for a pre-programmed period of time and determine that it is appropriate to enter into the low-power mode.

Continuing with the example upper-level logic 207, when the transmitter 200 is in the low-power mode, it may be appropriate to exit the low-power mode and go back to an active mode once there is system data to transmit. For instance, upper-level logic 207 may monitor FIFO 201 and may determine to exit the low-power mode when it loads system data and/or may monitor the data line into FIFO 201 to determine to exit the low-power mode when system data is fed into FIFO 201.

Upper-level logic 207 also communicates with clock module 208 to cause clock module 208 to reduce a clock rate that is applied to transmitter 200. Specifically, in this example, the reduced clock may be applied to the serializer 204, FFE 205, and driver 206 to transmit serialized data bits at the lower clock rate during the low-power mode. During the active mode, though, upper-level logic 207 may control clock module 208 to provide a clock at a normal rate. An example clock module 208 is described in more detail with respect to FIG. 4.

Multiplexor 202 selects between the data pattern from pattern generator 203 and the system data from FIFO 201, so that the data output from multiplexor 202 is from one of those two sources at any given time. As a general rule in this example, upper-level logic 207 causes multiplexor 202 to select system data from FIFO 201 during active mode and to select the data pattern from pattern generator 203 during the low-power mode. Further in this example, upper-level logic 207 may send a control signal to multiplexor 202 to cause multiplexor 202 to select one of those inputs.

Figure 3:
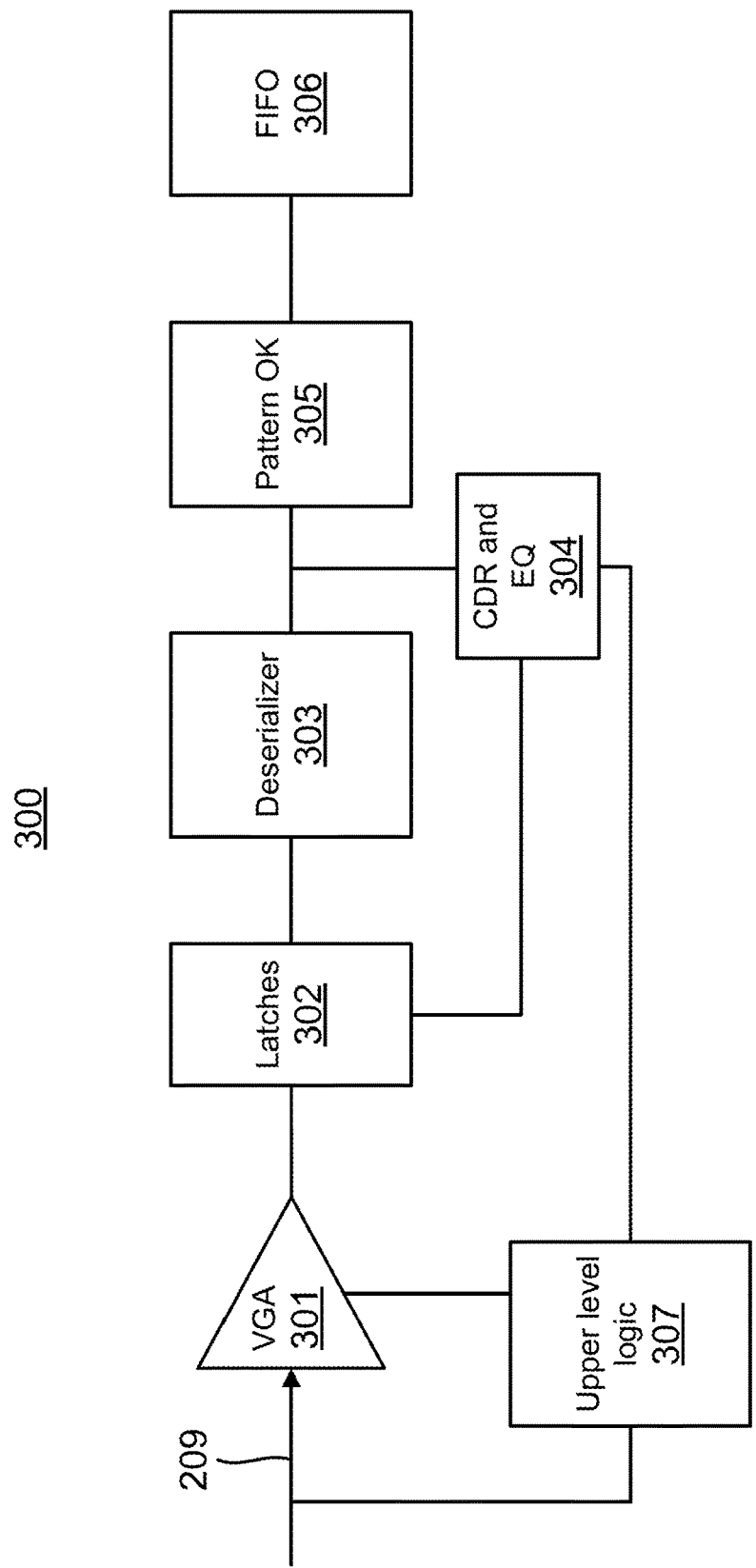
FIG. 3 is an illustration of example receive side circuitry of the chip-to-chip interface of FIG. 1, according to one embodiment.

FIG. 3 is an illustration of an example receiver 300, which may be included in a chip-to-chip interface such as that shown in FIG. 1. Specifically, in the example of FIG. 1, chip 120 may include multiple receivers the same as or similar to receiver 300 configured to receive data over links 130 from chip 110. In other words, FIG. 3 illustrates one receiver 300, and it is understood that a chip-to-chip interface may have multiple receivers, each of the receivers corresponding to a conductive line of links 130.

Looking at receiver 300, conductive line 209 carries serialized data that is either system data or originates from pattern generator 203. Variable gain amplifier 301 adjusts a gain of the received data before it passes the data to latches 302. Latches 302 output the serialized data to deserializer 303. Deserializer 303 de-serializes the data and passes the data further onto pattern checker 305 and to FIFO data buffer 306. FIG. 3 omits further downstream components for ease of illustration.

Upper-level logic 307, such as a receiver controller module, includes hardware or software logic to determine when the transmitter enters or exits a low-power mode and to take appropriate action. For instance, upper-level logic 307 monitors conductive line 209 to receive command signals from upper-level logic 207 at the transmitter and to act in response to those command signals.

For instance, in one example, upper-level logic 307 may receive a first command signal indicating that the transmitter is entering a low-power mode. Accordingly, the upper-level logic 307 may then send a control signal to variable gain amplifier 301 to cause variable gain amplifier 301 to halt performing adaptive variable gain control and to save its variable gain control settings. In response, the variable gain amplifier 301 applies the current variable gain control settings without adaptively varying the gain until upper-level logic 307 indicates otherwise. Upper-level logic 307 may include memory to save the variable gain control settings, or those gain control settings may be saved at variable gain controller 301 or some other appropriate place.

Similarly, upper-level logic 307 may receive an additional command signal indicating that the transmitter is subsequently exiting the low-power mode. In response, the upper-level logic 307 sends another control signal to the variable gain amplifier 301 to cause the variable gain amplifier 301 to resume adaptively performing automatic gain control. In response, variable gain amplifier 301 may access the saved gain control settings and apply them as a starting value as it resumes its adaptive algorithm.

Looking at upper-level logic 307, in response to receiving the command signal indicating that the transmitter is entering the low-power mode, it sends one or more control signals to clock and data recovery (CDR) and equalization (EQ) component 304 to cause the equalization circuits to halt adaptively performing equalization. In response, the equalization circuits save a current equalization setting either at upper-level logic 307 or at another appropriate place and to continue performing equalization, although not adaptively. Rather, during low-power mode, the equalization circuits apply the saved equalization settings. When upper-level logic 307 receives an additional command signal indicating that the transmitter is subsequently exiting the low-power mode, upper-level logic 307 sends another control signal to CDR and EQ 304 to cause equalization circuits to resume adaptively performing equalization. In response, the equalization circuits access the saved equalization settings and apply them as a starting value as it resumes its adaptive algorithm.

The CDR circuits at component 304 in this example receive the data and perform phase interpolation adaptively to keep either the leading edge or the falling edge of the received data within a particular window of allowed phase values relative to a clock to ensure that latches 302 can properly sample the data. In this example, the CDR circuits may adaptively adjust a phase locked loop (not shown), thereby adjusting the clock that is applied to latches 302 to maintain the phase lock on the data.

In the example of FIG. 3, the CDR circuits at component 304 continue to perform clock and data recovery to maintain a phase lock on the data during the low-power mode. Accordingly, the CDR circuits continue to adaptively adjust the phase locked loop to maintain phase lock both before, during, and after the low-power mode.

Figure 4:
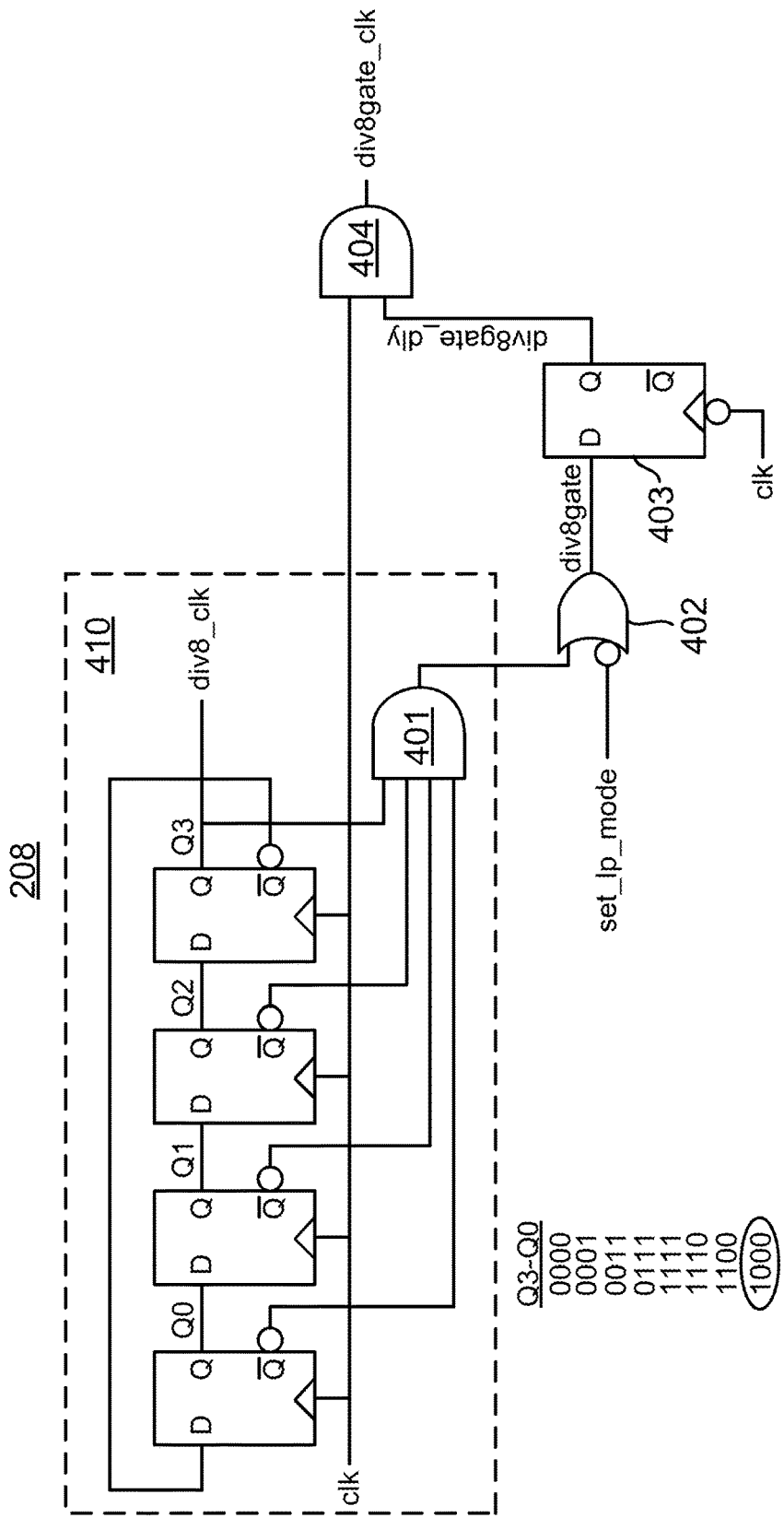
FIG. 4 is an illustration of an example clock module on a transmit side of the chip-to-chip interface of FIG. 1, according to one embodiment.

FIG. 4 is an illustration of an example clock module 208 (FIG. 2), according to one embodiment. The example clock module 208 of FIG. 4 is operable to provide an undivided clock (clk) and a clock that is divided by eight (div8gate_clk). Of course, the scope of embodiments is not limited to a clock that is divided by eight, as various embodiments may divide the clock by any appropriate amount, such as 2, 4, 16, etc., by increasing or reducing a number of flip-flops.

Figure 5:
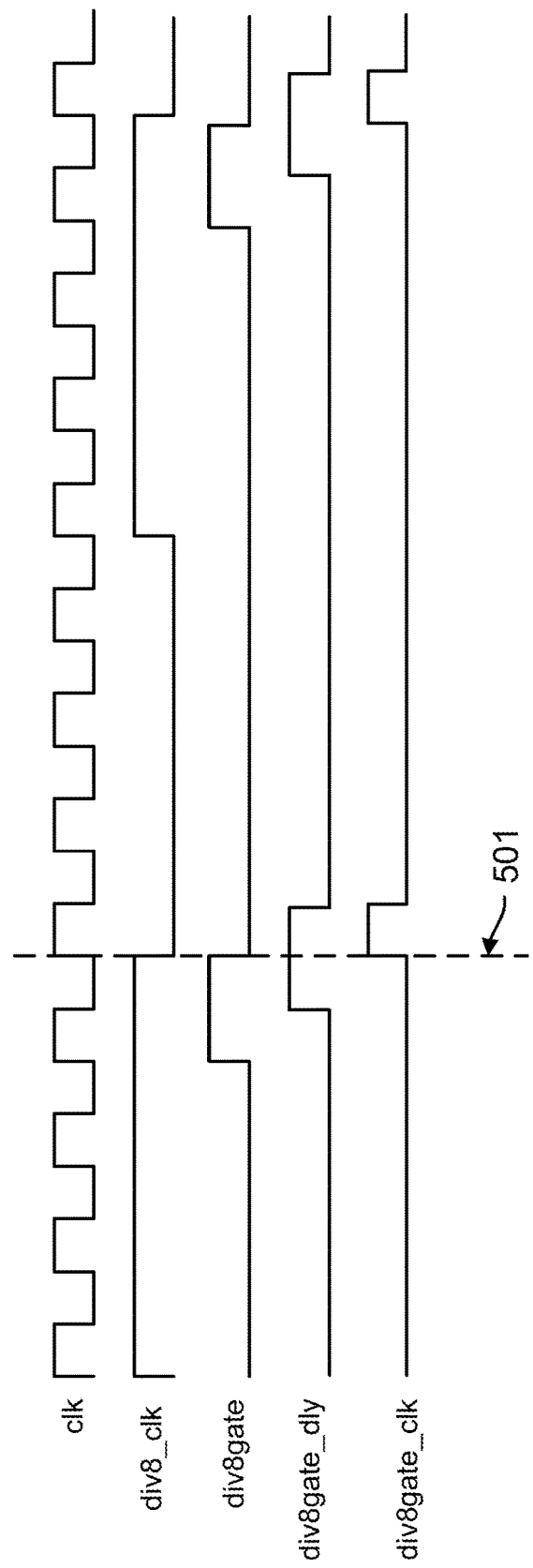
FIG. 5 includes example clock timing diagrams for the clock module of FIG. 4, according to one embodiment.

The clock module 208 of FIG. 4 includes a Johnson counter 410, which has four flip-flops Q0-Q4. The undivided clock (clk) is shown in FIG. 5. The output of flip-flop Q3 is shown as div8_clk, which is divided by eight relative to clk, although the pulses are wider. The outputs of each of the flip-flops Q0-Q4 are input to AND gate 401. The particular Johnson counter 410 of FIG. 4 is configured so that its output from AND gate 401 is a two-bit wide pulse occurring when the inputs to AND gate 401 are 1000. However, the scope of embodiments is not limited to that particular configuration, as any combination of binary ones and zeros at the output of flip-flops Q0-Q3 may be chosen to cause the two-bit wide pulse.

The output of AND gate 401 is one of the inputs to OR gate 402, where the set_1p_mode signal acts as an enable. In the present example, upper-level logic 207 may provide set_1p_mode to clock module 208 to cause clock module 208 to output either a divided (div8gate_clk) or an undivided (clk) clock. Specifically, in this example, when set_1p_mode has a value of one, it causes clock module 208 to output the divided clock (div8gate_clk) and when set_1p_mode has a value of zero it causes clock module 208 to output the undivided clock (clk). Or put another way, the output of AND gate 404 is either the divided clock or the undivided clock.

Flip-flop 403 is a negative clock edge flop, and it delays the div8gate signal by half a cycle. The output of flip-flop 403 is input to AND gate 404, so that the resulting divided by eight clock looks like that shown in FIG. 5 (div8gate_clk). In other words, in this example when set_1p_mode enables clock dividing, one out of every eight full rate clk cycles is a pulse, and div8gate_clk has the same pulse width as the undivided clock clk, and the rising edge of the pulse of div8gate_clk has minimal or no perceptible phase shift from the undivided clock clk. This is illustrated by dashed line 501. Thus, since the divided clock div8gate_clk has a same phase as the undivided clock clk, it causes the transmitter to transmit the data also having a same phase, and this allows the receiver to maintain a phase lock on the data even during low-power mode.

Figure 6:
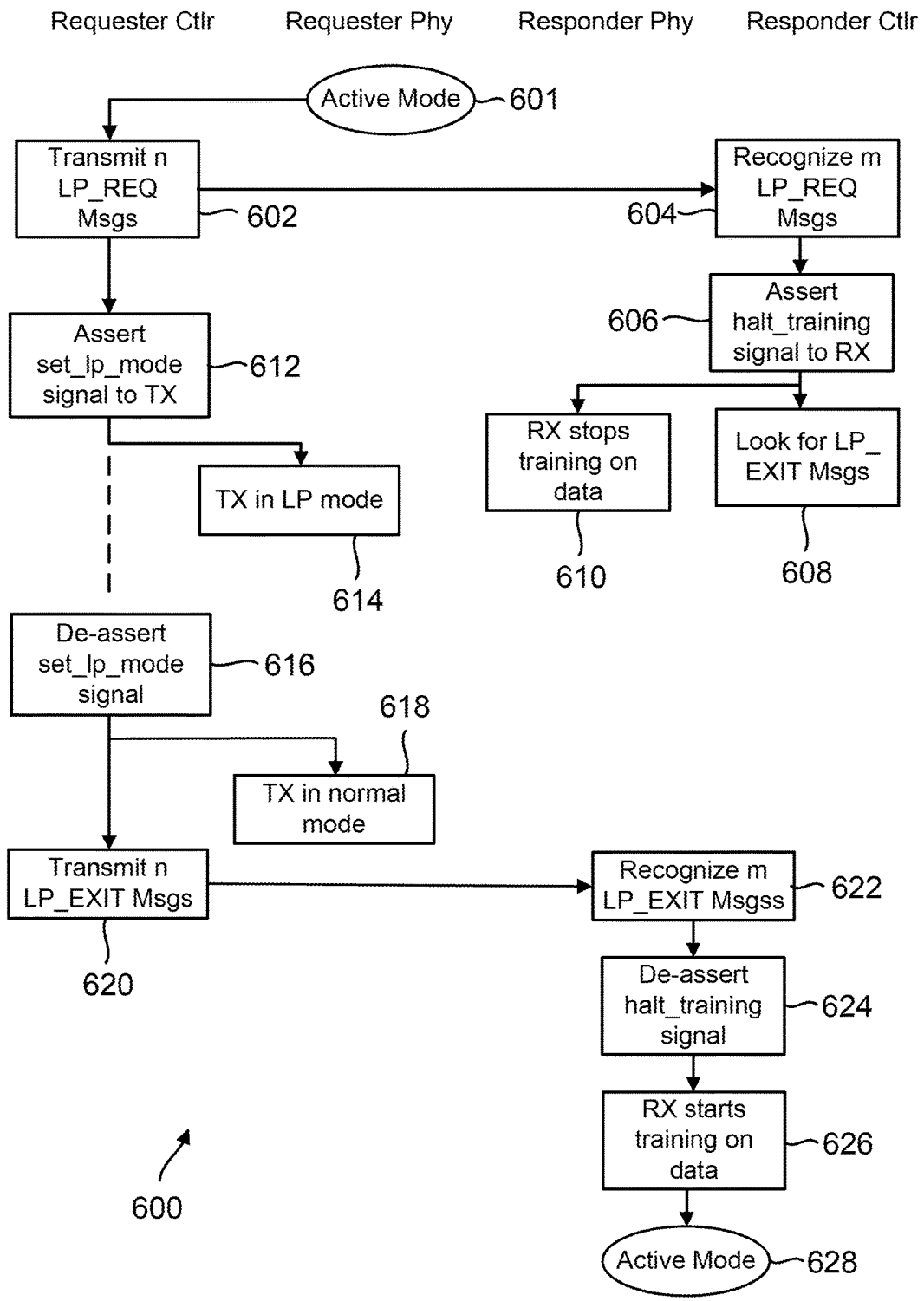
FIG. 6 is an illustration of an example method for entering and exiting the low-power mode, according to one embodiment.

FIG. 6 is an illustration of method 600 for entering and exiting a low-power mode. The method 600 may be performed by a transmitter and receiver, such as the example transmitter 200 and FIG. 2 and example receiver 300 FIG. 3. In this example, Requester Ctrl may correspond to upper-level logic 207 (FIG. 2) and Responder Ctrl may correspond to upper-level logic 307 (FIG. 3). The Requester Phy may correspond to a serializer 204, FFE 205, and driver 206, whereas Responder Phy may correspond to the VGA 301, latches 302, and deserializer 303.

In some examples, upper-level logic (e.g., logic 207 or logic 307) includes processing circuitry that executes computer readable instructions to determine when to enter or exit a low-power mode and when to perform other appropriate actions in response to either entering or exiting the low-power mode. In some embodiments, the upper-level logic 207 or 307 may include hardware and/or software to perform the functionality described in FIGS. 6 and 7.

At action 601, the transmitter and receiver combination is operating according to the active mode. In this example, the active mode includes operating at the normal clock frequency clk and passing system data from the transmitter to the receiver over a high-speed serial link.

At action 602, the Requester Ctrl determines that it is appropriate to enter into a low-power mode, so it sends a command signal (LP_REQ) to the Responder Ctrl. The command signal be in any particular format, such as a 128 bit command signal for which the Responder Ctrl is programmed to recognize. At action 604, the Responder CTRL receives the command signal and determines that the transmitter is entering the low-power mode. Accordingly, the Responder CTRL causes the receiver to halt performing adaptive gain control and equalization on the received data at actions 606 and 610. As noted above, the receiver may save its gain control and equalization settings and continue to use the same equalization and gain control settings outside of an adaptive control loop during the low-power mode. Also, at actions 608 and 610 the Responder CTRL is no longer looking for system data, instead examining the data input for an additional command signal from the transmitter to indicate that the transmitter is exiting the low-power mode.

Returning to the transmitter side, at actions 612, the Requester CTRL asserts the set_1p_mode signal, thereby causing the transmitter clock module to begin clock division. In the examples above, the clock divides by eight during the low-power mode, although other embodiments may use different clock division factors. At action 614, the transmitter is in low-power mode. As described in the examples above, low-power mode may include both operating at a divided clock rate and transmitting a preprogrammed pattern for data, such as 1010, instead of system data.

At this point in time, both the receiver and the transmitter are operating in a low-power mode. At the transmitter side, this may include operating at a lower clock rate and providing preprogrammed bit patterns as data at the lower clock rate, whereas on the receive side it may include halting adaptive variable gain and equalization operations while continuing to maintain phase lock on the data. The transmitter and receiver continue in the low-power mode until the upper-level logic determines that it is appropriate to exit the low-power mode.

At action 616, the Requester CTRL de-asserts the set_1p_mode signal in response to determining that it is appropriate to exit the low-power mode. For instance, as described above, the upper-level logic may monitor a transmitter FIFO or a data input line and determine that there is system data to be transmitted. Accordingly, the upper-level logic may then determine to exit the low-power mode by de-asserting the set_1p_mode signal. In response, the clock module provides the undivided clock to the Requester Phy, which then sends data over the link to the receiver at the undivided clock rate, and the transmitter is in normal mode at action 618. Continuing with the example, the transmitter causes the multiplexer to select the input from the FIFO rather than the preprogrammed pattern generator bits. In some embodiments, the FIFO may send dummy data during this period to allow the receiver time to detect the next command signal and to resume its adaptive variable gain and equalization algorithms.

Accordingly, at action 620 the Requester CTRL sends an additional command signal (LP_EXIT) to the Responder CTRL to instruct the receiver to exit the low-power mode. The Responder CTRL recognizes the command signal, and in response to the command signal de-asserts the halt_training signal at action 624 and resumes training on data at action 626. For instance, action 626 may include resuming adaptively performing variable gain control and equalization by applying the saved variable gain and equalization settings. Note that at this point, the receiver has been maintaining a phase lock on the data throughout the low-power mode, so in this example the system is benefited by saving any time that would otherwise have been used to establish phase lock.

The transmitter may at this point transmit system data over the link to the receiver, and the receiver after action 626 is in full active mode 628. Accordingly, the receiver latches, equalizes, and sends the system data on to downstream components.

Although shown explicitly in FIG. 6, it is noted that other actions may be performed during entry and exit of the low-power mode. Specifically, the data entering the FIFO may be scrambled so that selection by the multiplexor of either the pattern bits or the FIFO input necessarily chooses between scrambled or non-scrambled data. Accordingly, during normal operating mode (e.g., active mode) the receiver may see data that otherwise appears random due to the scrambling, whereas beginning at action 614, the receiver may see the preprogrammed data that is a repeating pattern rather than pseudorandom. Examples of scrambling may include, but are not limited to, coding such as 8*b*10*b*. Then once again at action 618, the data may begin to appear random as the multiplexor selects the FIFO data input.

Figure 7:
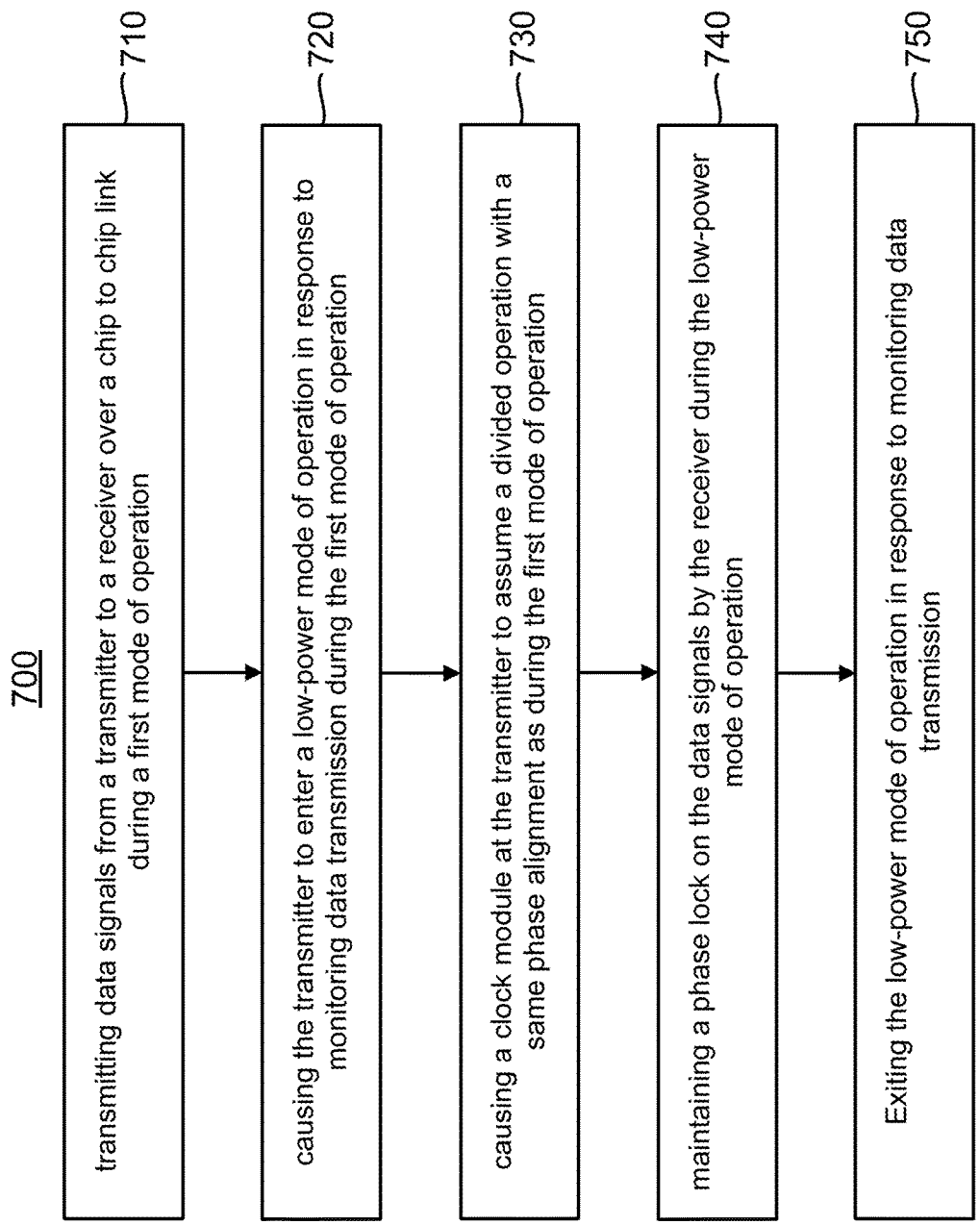
FIG. 7 is an illustration of an example method, according to one embodiment.

FIG. 7 is an illustration of example method 700 for entering and exiting low-power mode by a chip-to-chip interface, according to one embodiment. The actions of method 700 may be performed for example by the upper-level logic 207, 307 of FIGS. 2 and 3 as a chip-to-chip interface determines to enter low-power mode and exit low-power mode. The upper-level logic may provide such functionality by executing computer readable instructions from computer readable media, and the upper-level logic may be implemented using hardware and/or software.

At action 710, the transmitter transmits data signals to a receiver over a high-speed serial data link during a first mode of operation. The first mode of operation may include, e.g., operating in a first clock rate and sending system data over the chip-to-chip link. Furthermore, in some embodiments the system data may include scrambled data from a transmitter FIFO buffer. Action 710 may also include monitoring a data buffer, such as a FIFO buffer, at the transmit side for system data. On the receive side, the receiver performs adaptive variable gain control, adaptive equalization, and maintains a phase lock on the data.

At action 720, the upper-level logic of the transmitter side causes the transmitter to enter a low-power mode of operation in response to monitoring data transmission during the first mode of operation. For example, the upper-level logic may monitor the data transmission and determine that the data buffer is empty of data or that there is no system data or little system data at the input to the FIFO data buffer. In this example, the upper-level logic determines to enter the low power mode in response to determining that the data buffer is empty data or that there is no system data or little system data at the input to the data buffer. In any event, various embodiments may use any appropriate criteria to determine that low-power mode should be entered.

At action 730, the upper-level logic causes the clock module at the transmitter to assume the divided operation with a same phase alignment as during the first mode of operation. Examples are shown above, wherein the undivided clock clk is used during active mode or normal mode, and the divided clock div8gate_clk is used during the low-power mode. Whether the transmitter uses its active mode clock or its divided clock, the clock triggers data to be sent over the serial link to the receiver.

Actions 720 and 730 may also include sending a first command signal from the transmitter to the receiver over the link, wherein the first command signal indicates that the transmitter is entering the low-power mode. At the receiver side, the receiver halts performance of equalization and variable gain control and saves equalization and variable gain control settings.

At action 740, the receiver maintains a phase lock on the data signals during the low-power mode of operation. As noted above, the receiver maintains a phase lock also during the first mode of operation as well. In the examples above, the receiver maintains the phase lock by performing CDR on the received data and adjusting a phase locked loop to clock a latch so that the data is latched on the receive side within a particular phase window.

At action 750, the upper-level logic at the transmitter exits the low-power mode of operation in response to monitoring data transmission. For instance, the upper-level logic of the transmitter may monitor a FIFO data buffer or a data line in and determine that system data is being received and should be transmitted on the data link. For instance, the upper-level logic at the transmitter may determine that the FIFO buffer at the transmitter includes data and may then send a second command signal to the receiver, wherein the second command signal indicates that the transmitter is exiting low-power mode. In response, the receiver resumes performance of equalization and variable gain control by applying the saved equalization and variable gain control settings.

The upper-level logic of the transmitter may then resume using the active mode clock, e.g., an undivided clock. In an embodiment in which the transmitter was using a pattern generator during the low-power mode, the transmitter may switch to transmitting system data as it exits the low-power mode in interest the active mode.

The scope of embodiments is not limited to the specific method shown in FIG. 7. Other embodiments may add, omit, rearrange, or modify one or more actions. For instance, method 700 may include entering and exiting low-power mode multiple times during operation of a device by repeating actions 710-750 as system data is either available are not available for transmitting on the transmitter side.

Various embodiments may include one or more advantages over conventional solutions. For instance, while some conventional solutions may turn the receiver side off or partly off, various example embodiments described herein may leave the receiver on just enough to maintain CDR lock. Specifically, various example embodiments described herein may maintain a phase lock on data at the receiver side, thereby reducing or eliminating time that would otherwise be used to regain a phase lock on the receiver side during exit of the low-power mode. Such embodiments may save some power at the receiver side by halting activities, such as adaptive gain control and adaptive equalization.

Moreover, various embodiments may divide a clock frequency during low-power mode of the transmitter, and the act of dividing the clock frequency may result in power savings at the clock tree on the transmitter side because fewer bits are being latched and driven per unit time. Additionally, various embodiments that select between an active mode clock and a divided clock may see reduced exit time because the clock gating mechanism (e.g., as noted above with respect to FIGS. 4 and 5) may add negligible time to the exit process. This is in contrast to some conventional solutions that may turn off transmitters or receivers altogether and may therefore use more exit time.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A system comprising:
a transmitter coupled to a link;
a receiver coupled to the link and configured to receive signals over the link from the transmitter;
a transmit control module configured to cause the transmitter to enter and exit a low-power mode; and
a clock module coupled to the transmitter and configured to provide a clock signal to the transmitter, wherein the clock module is further configured to provide the clock signal as a divided clock signal to the transmitter when the transmitter is in the low-power mode, further wherein the divided clock signal has a same phase as the clock signal before entry into the low-power mode, and further wherein the receiver is configured to halt performing adaptive equalization and variable gain control in response to the transmitter entering the low-power mode.

2. The system of claim 1, wherein the link comprises a high-speed serial data link between the transmitter and the receiver.

3. The system of claim 2, wherein the link comprises a chip-to-chip link, and wherein the transmitter is disposed on a first semiconductor chip and the receiver is disposed on a second semiconductor chip.

4. The system of claim 1, wherein the receiver is configured to remain on during the low-power mode and during an active mode.

5. The system of claim 1, wherein the receiver is configured to remain phase locked on a data signal from the transmitter during the low-power mode.

6. The system of claim 1, wherein the receiver is further configured to save variable gain control settings and equalization settings in response to the transmitter entering the low-power mode.

7. The system of claim 6, wherein the receiver is further configured to resume performing adaptive equalization and variable gain control, in response to the transmitter subsequently exiting the low-power mode, by applying the variable gain control settings and equalization settings.

8. A method comprising:
transmitting data signals from a transmitter to a receiver over a serial data link during a first mode of operation;
causing the transmitter to enter a low-power mode of operation in response to monitoring data transmission during the first mode of operation;
in response to entering the low-power mode of operation, causing a clock module at the transmitter to assume a divided operation with a same phase alignment as during the first mode of operation;
maintaining a phase lock on the data signals by the receiver during the first mode of operation and during the low-power mode of operation;
sending a first command signal from the transmitter to the receiver over the serial link; and
in response to receiving the first command signal, halting adaptive equalization and variable gain control at the receiver and saving equalization and variable gain control settings.

9. The method of claim 8, wherein the data signals comprise a repeating set of digital bits during the low-power mode of operation.

10. The method of claim 8, wherein the data signals comprise scrambled data during the first mode of operation.

11. The method of claim 8, further comprising:
monitoring a first in first out (FIFO) data buffer at the transmitter to determine that the FIFO data buffer is empty of data; and
determining to enter the low-power mode of operation in response to determining that the FIFO data buffer is empty of data.

12. The method of claim 8, further comprising:
sending a second command signal from the transmitter to the receiver over the serial link; and
in response to receiving the second command signal, resuming adaptive equalization and variable gain control at the receiver by applying saved equalization and variable gain control settings.

13. The method of claim 8, further comprising:
subsequent to entering the low-power mode of operation, exiting the low-power mode of operation in response to determining that a first in first out (FIFO) data buffer at the transmitter includes data.

14. An apparatus comprising:
means for transmitting data signals over a serial data link;
means for receiving the data signals over the serial data link; and
means for providing a clock signal to the transmitting means, including means for providing the clock signal as a divided clock signal to the transmitting means when the transmitting means is in a low-power mode, wherein the divided clock signal has a same phase as the clock signal before entry into the low-power mode, and further wherein the receiving means further comprise means to halt performing equalization and variable gain control and to save equalization settings and variable gain control settings in response to the transmitting means entering the low-power mode.

15. The apparatus of claim 14, wherein the receiving means is configured to maintain a phase lock on the data signals during the low-power mode.

16. The apparatus of claim 14, wherein the transmitting means is disposed on a first semiconductor chip and the receiving means is disposed on a second semiconductor chip.

17. The apparatus of claim 14, wherein the receiving means is configured to remain on during the low-power mode and during an active mode.

18. The apparatus of claim 14, wherein the receiving means further comprises means to resume performing equalization and variable gain control by applying the variable gain control settings and equalization settings in response to the transmitting means subsequently exiting the low-power mode.

* * * * *